US006625671B1

(12) United States Patent
Collette et al.

(10) Patent No.: US 6,625,671 B1
(45) Date of Patent: Sep. 23, 2003

(54) COMPRESSION OF BUFFERED DATA

(75) Inventors: William C. Collette, Mahtomedi, MN (US); Richard L. Cain, St. Paul, MN (US); Brian A. Johnson, Brooklyn Park, MN (US); Steve Flattum, Fridury, MN (US); Jim Kunz, Plymouth, MN (US); Mark Mansee, Vadnais Heights, MN (US)

(73) Assignee: Computer Network Technology Corporation, Minneapolis, MN (US)

(*) Notice: Subject to any disclaimer, the term of this patent is extended or adjusted under 35 U.S.C. 154(b) by 0 days.

(21) Appl. No.: 09/303,704

(22) Filed: May 3, 1999

(51) Int. Cl.[7] ............................................. G06F 13/00
(52) U.S. Cl. ............................. 710/52; 710/4; 710/20; 710/33; 710/53; 710/54; 710/55; 710/56; 710/57; 710/68; 710/310
(58) Field of Search ................................. 710/4, 20, 33, 710/52, 53, 54, 55, 56, 57, 68, 310

(56) References Cited

U.S. PATENT DOCUMENTS 5,627,995 A * 5/1997 Miller et al. ................. 711/171
5,778,255 A * 7/1998 Clark et al. .................... 710/68
6,145,069 A * 11/2000 Dye ............................. 711/170

OTHER PUBLICATIONS

Jim Kunz, Channel Link Compression Module (CCMI), Hardware Specifications, Sep. 23, 1996.
CNT, Channelink Web Page.

* cited by examiner

Primary Examiner—Jeffrey Gaffin
Assistant Examiner—Mohammad O. Farooq
(74) Attorney, Agent, or Firm—Beck & Tysver, P.L.L.C.

(57) ABSTRACT

A method and apparatus is presented providing high-performance lossless data compression implemented in hardware for improving network communications. A compression module useful in a switching platform is also presented capable of compressing data stored in buffer memory. Instructions for a compression task are assigned to the compression module by a microprocessor writing a control block to a queue in stored local memory. The control block informs the compression module of the size and location of the unprocessed data, as well as a location in the buffer memory for storing the processed data and the maximum allowed size for the compressed data. Using this technique, the microprocessor can limit the compression of data to those data streams allowing compression, to those segments that are susceptible to compression, and to those segments that are large enough to show a transmission speed improvement via compression.

46 Claims, 7 Drawing Sheets

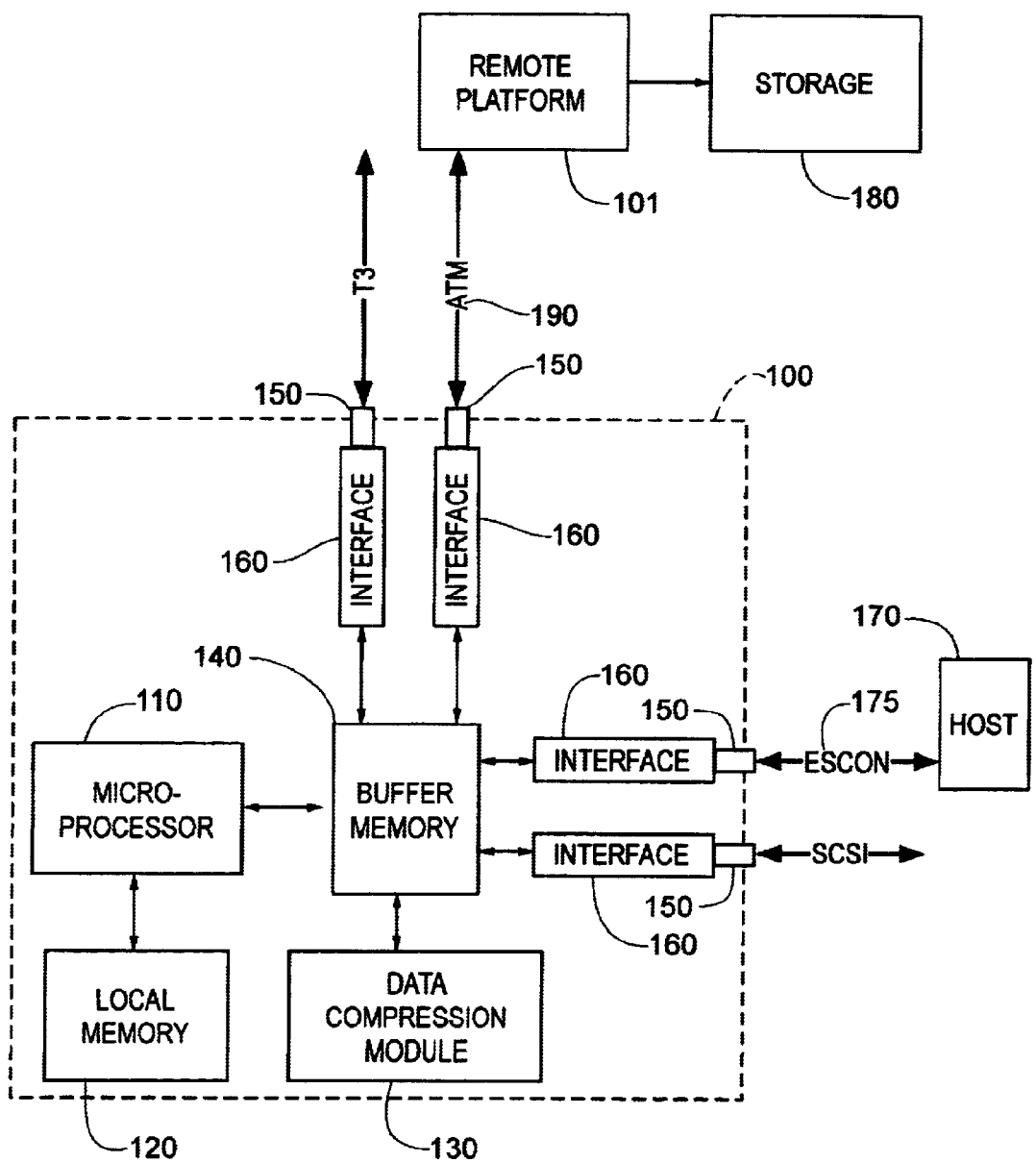

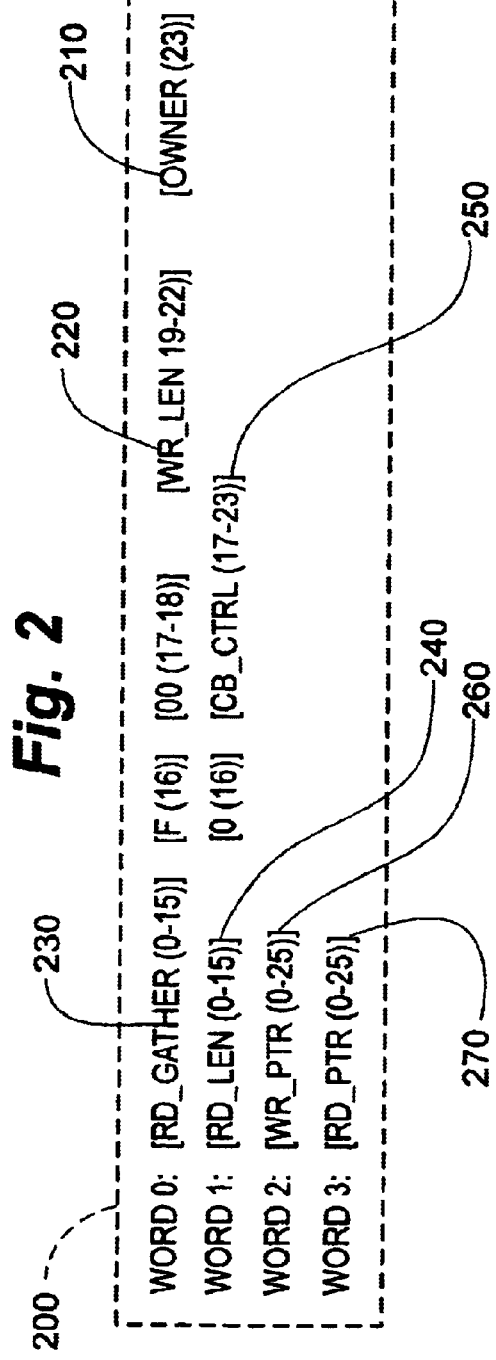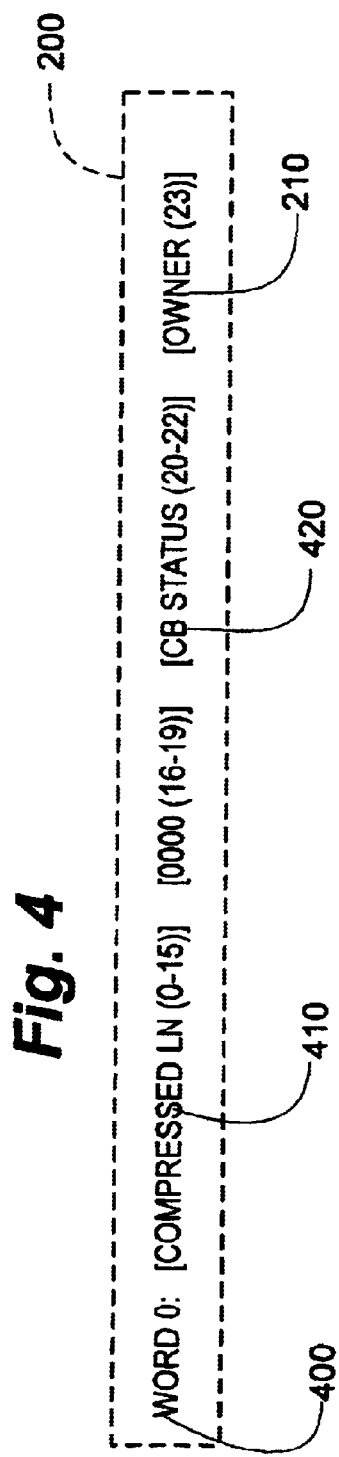

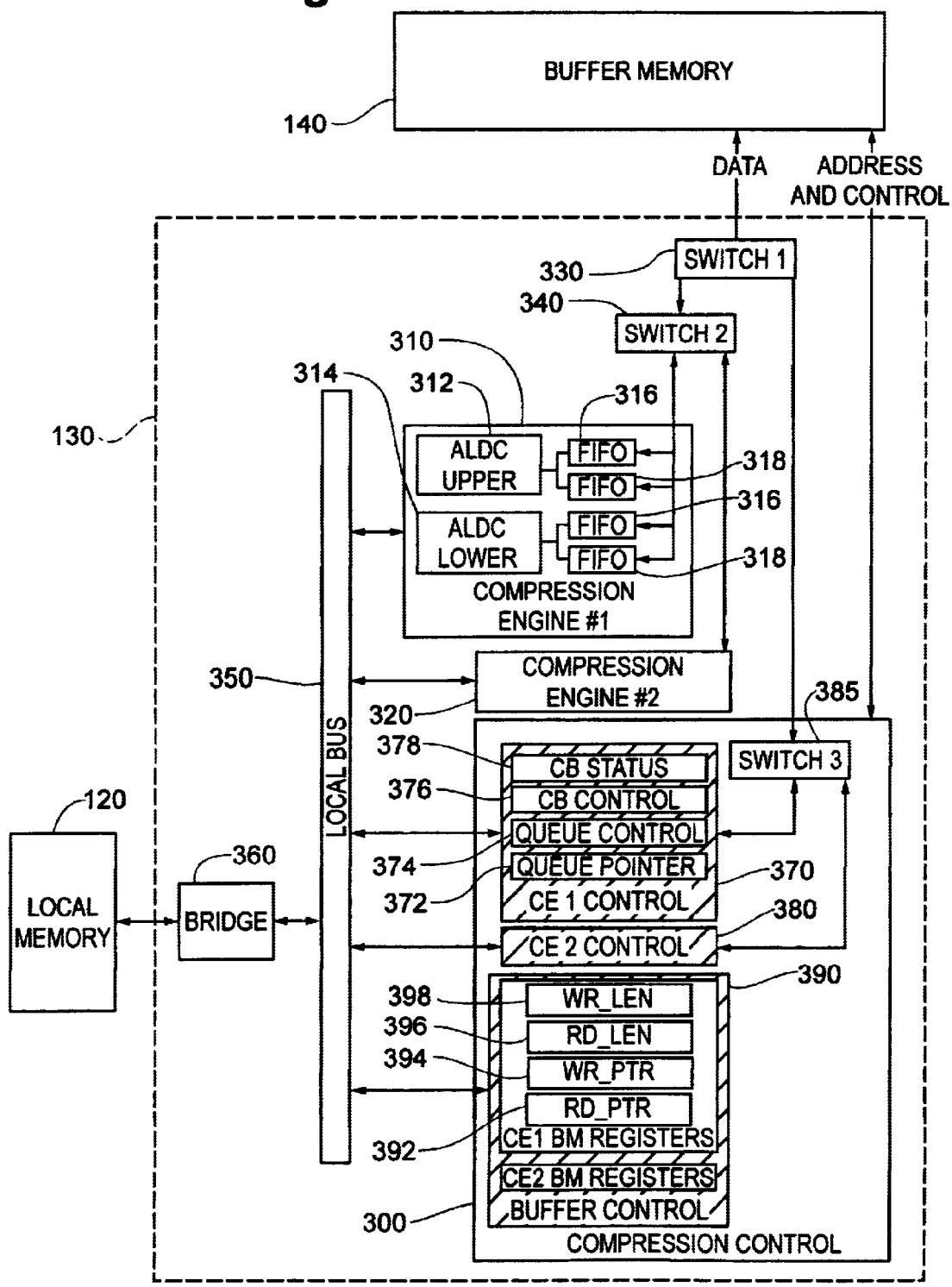

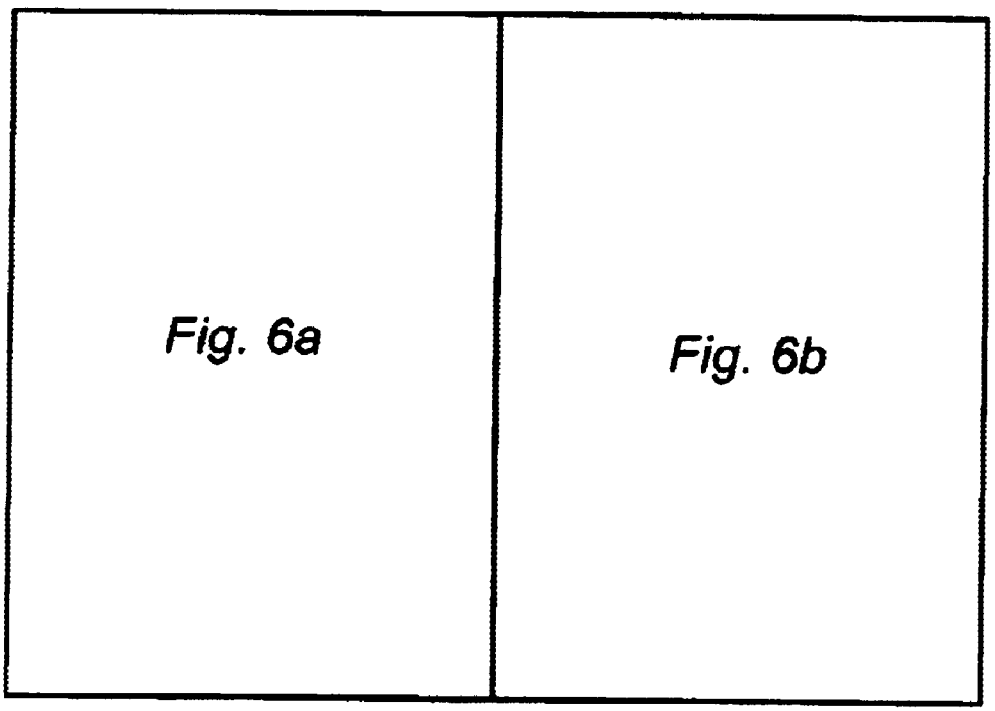

COMPRESSION OF BUFFERED DATA

FIELD OF THE INVENTION

The present invention relates in general to methods and apparatus for electronic data communication, and particularly to a method of compressing buffered data being transmitted between digital devices.

BACKGROUND OF THE INVENTION

In conventional networked systems, data is often transmitted between digital devices over a variety of protocols. Switching platforms exist that are capable of converting and switching data from one protocol to another. For instance, data can be transmitted by an IBM mainframe over an ESCON channel protocol. A switching platform can receive such an ESCON data stream and redirect the data over a different channel protocol like SCSI, or even a network protocol such as ATM. Using such devices, IBM mainframes can communicate to otherwise incompatible devices such as a SCSI storage device using a known protocol like ESCON.

Switching platforms may also allow remote access to devices that are physically located beyond the limits of a particular communications protocol. For instance, local ESCON data streams can be converted to a Wide Area Network protocol such as ATM and easily be transmitted across the continent. A separate switching platform at the receiving site can receive the data stream and convert it back to the original or another protocol, whatever is appropriate for the receiving device.

When converting data streams between protocols and transmitting the data streams over large distances, it is important that the data flow between devices be as efficient as possible. To maximize transmission speeds, it is often useful to compress the data before transmission. It is well known, for instance, to compress all data in a data stream in order to speed transmission between two like devices. This type is transmission is well documented in protocols such as those used for modem to modem data compression.

Unfortunately, several difficulties prevent the use of the same type of data compression techniques over channel or network communications. First, data transmitted over a channel or network must contain destination information that can be understood by devices on the channel or network. This destination information cannot be compressed or encrypted, or else other devices on the channel or network will not recognize the data and the data could not be properly routed.

Second, data is often transmitted in fragments that are so small that fragment by fragment compression would sometimes slow down data transmission. Thus, it is important to selectively compress only those fragments large enough that compression actually reduces the transmission time.

Third, the receiving device will usually expect to receive the data uncompressed. As a result, compression should only take place where a mechanism exists at the receiving end to decompress the data before the data is presented to the receiving device. If no such mechanism exists, the data stream should not be compressed.

What is needed then is a compressing mechanism that overcomes these difficulties by compressing message packets in a way that header information is readable by other devices, and in a way that compression can be selectively engaged on both a fragment-by-fragment basis and on a path-by-path basis.

SUMMARY OF THE INVENTION

The present invention meets this need by providing a mechanism for compressing data in a data stream without compressing destination information. The present invention is also capable of selectively compressing only those packets that are large enough that the time required for data compression will be offset by decreased transmission time. Finally, the present invention incorporates this compression technique in a multi-port gateway switch that can selectively engage compression only to those destinations that have the capability for decompression.

Specifically, the present invention teaches a method and apparatus for implementing efficient data compression. According to one embodiment, a data compression module comprises compression control circuitry and a plurality of compression engines. The compression module receives instructions for compressing or decompressing through a control block interface. FIFOs are provided for the compression engines to store unprocessed and processed data. The compression control circuitry manages the data flow between the FIFOs and external buffer memory. The status of the compression or decompression task is stored in the compression control.

In a further embodiment, the compression module is incorporated in a switching apparatus for selectively encoding messages transmitted over a network or channel protocol. The apparatus includes a microprocessor, a local memory coupled to the microprocessor, a multi-ported data buffer memory coupled to the microprocessor and a data compression module coupled to the buffer memory and the local memory. The microprocessor communicates to the microprocessor through control blocks stored in the local memory. Data to be processed and processed data are both stored in the multi-ported data buffer.

In a further embodiment, the switching apparatus supports multiple simultaneous network or channel interfaces. Each of these interfaces is able to convert data streams from a particular network or channel protocol to a common data protocol used for storing data in the buffer memory. The data that is being transmitted between various interfaces can be compressed or uncompressed, depending on the compressability of the data, the capabilities of the receiving device, or the size of the data segments being transmitted.

A method is also described that allows data in the buffer memory to be selectively compressed. This method includes the steps of writing a control block to the local memory, reading the control block to determine uncompressed data location and size as well as the location at which the compressed data is to be stored, compressing the data and storing the data at the appropriate locations in the buffer memory, and reporting the status and success of the compression by writing over a portion of the control block.

BRIEF DESCRIPTION OF THE DRAWINGS

FIG. 1 illustrates the switching platform environment in which the present invention is utilized.

FIG. 2 illustrates the components of a control block as used in the present invention.

FIG. 3 is a block diagram of a compression module according to one embodiment of the present invention.

FIG. 4 illustrates the re-written first word of a control block as used in the present invention.

DETAILED DESCRIPTION OF THE INVENTION

Basic Structure

Figure 5:
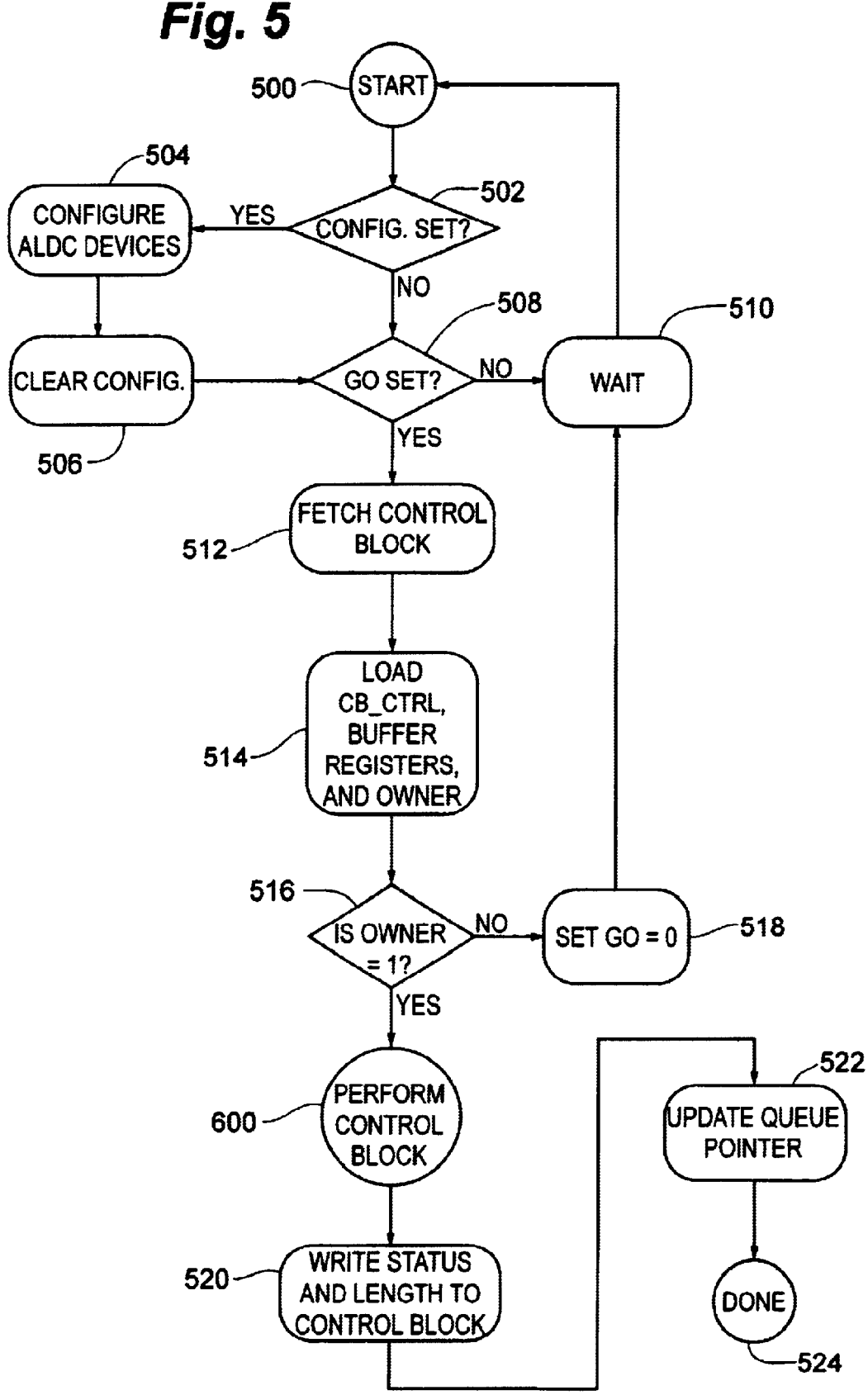
FIG. 5 is a data flow logic diagram according to one embodiment of the present invention.

FIG. 1 is a block diagram of switching platform 100 using the present invention. Platform 100 utilizes four major subcomponents, namely a microprocessor 110, local memory 120, a data compression module 130, and data buffer memory 140. These components communicate with one another and with input/output ports 150 as indicated by the two-way arrows in FIG. 1. This communication can occur in a variety of ways, but is accomplished in the preferred embodiment by incorporating the elements into separate modules connected by a PCI bus.

As is shown in FIG. 1, buffer memory 140 is multi-ported memory, allowing microprocessor 110, data compression module 130, and the plurality of interfaces 160 all to have direct access to memory locations within buffer memory 140. This allows more efficient data movement within the switching platform 100.

Each of the ports 150 is connected to the rest of the switching platform 100 through the use of interfaces 160. Each interface 160 is specially designed to translate to and from a particular network or channel protocol such as ESCON, SCSI, ATM, T3/E3, 10/100 Ethernet, and Fibre Channel. Each of the data streams coming through one of the ports 150 will contain headers with destination information that microprocessor 110 can comprehend. The incoming data is stored temporarily in buffer memory 140. When the data is ready to be transmitted, microprocessor 110 informs the appropriate interface 160 of the data's destination and the buffer memory location. The interface 160 then takes the destination information and the data found in the buffer memory location, and then constructs data segments appropriate for its protocol.

As an example, a host computer 170 may be communicating via its ESCON channel 175 with a remote storage device 180 over the ATM wide area network 190. In such an arrangement, ESCON packets sent by host computer 170 will be received by switching platform 100 over the port 150 connected to ESCON channel 175. Microprocessor 110 will read the header information on this incoming data stream, and direct the data to be outputted over the interface 160 and port 150 connected to the ATM network 190. The interfaces 160 work cooperatively allowing the ESCON data stream to be interpreted by the first interface 160, and then stored in the Buffer Memory 140 in a common, raw format. The second interface 160 can then retrieve the data from Buffer Memory 140 in the raw format. The data and its destination information are then reformatted for ATM protocols and sent over the ATM network 190. Also connected to the ATM network 190 is a second switching platform 101 that can receive the data over the ATM network and convert it to a protocol (such as the SCSI channel protocol) appropriate for the remote storage device 180. Similarly, data received from the remote storage device 180 over the ATM network 190 will be temporarily stored in buffer 140 in the raw format before being routed to the host computer 170 over ESCON Channel 175.

Thus, all data passing through the switching platform 100 will be temporarily stored in buffer memory 140. Processor 110 tracks the source and destination of this buffered data, along with information about the compression capabilities available along each of the ports 150. Processor 110 is able to recall this information from local memory 120.

It is sometimes advantageous to compress the data before it is transmitted over a network. For instance, the data stream from host computer 170 to remote storage 180 could be sent faster over the ATM network 190 if it is first compressed. Of course, a device such as the second switching platform 101 must exist at the remote location to decompress the data before it is presented to remote storage device 180. By examining the source and destination information, the microprocessor is able to determine which information in buffered memory 140 must be compressed or decompressed, and which information should be transmitted as is.

Control Block Queue

Once processor 110 has determined that some buffered data is to be compressed, it communicates this to data compression module 130 by writing information to a queue in local memory 120. Each entry in the queue provides the information necessary for compressing a contiguous block of data. This queue entry is referred to in the preferred embodiment as a control block. As can be seen in FIG. 2, a control block 200 consists of four words. The first word contains an ownership bit 210 that identifies ownership of the control block 200. When the ownership bit 210 is set to 0, the microprocessor 110 is considered to own the control block 200. When set to 1, the ownership bit 210 indicates that the compression module 130 owns the control block 200. The first word also contains a write length limit (or "Wr_Len") 220. The write length limit 220 contains the maximum number of words that the data compression module 130 can use for the compressed data. If the length of the compressed data exceeds this limit 220, then compression on this data should be terminated by the data compression module 130 and an error should be returned. By setting the write length limit 220 to a known fraction of the length of the entire data segment to be compressed, the microprocessor 110 can prevent the data from being compressed when a predetermined compression ratio is not obtained.

On decompression, the write limit 220 operates as a safety valve. An error occurs if the decompression task writes more data to buffer memory 140 than the expected ranged indicated by write limit 220.

The first word of control block 200 also contains the read gather block length (or "Rd_Gather") 230. The read gather block length 230 indicates the size of the total segment of data to be compressed.

The second word of control block 200 contains the read length (or "Rd_Len") 240, which indicates the length of the current block of data to be read in long words. The second word also contains the control block control 250, which allows the microprocessor 110 to communicate control information to the data compression module 130. The third word consists of the write pointer (or "Wr_Ptr") 260, identifying the location in buffer memory 140 in which the result of the compression or decompression will be stored. The fourth word consists of the read pointer (or "Rd_Ptr") 270, identifying the location in buffer memory 140 where the incoming data is held.

The read length 240 is distinguished from the read gather block length 230 in that the read length 240 indicates how much of the data in the total data segment can be found in the buffer memory in the contiguous memory locations directly following the read pointer 270 memory location. If the total data segment being compressed is found in non-contiguous memory locations in the buffer memory 140, then multiple control blocks will be used to present this data to the data compression module 130. In these circumstances, the read gather block length 230 will indicate the size of the whole data segment, and will be larger than the read pointer 240 size, which only indicates the size of the current contiguous data size.

As seen in FIG. 3, the data compression module 130 actually contains two compression engines 310, 320, allowing data compression module 130 to perform two separate compression tasks simultaneously. The two compression engines 310, 320 are identical, although more details of the first compression engine 310 are shown in FIG. 3. Microprocessor 110 allocates compression tasks between the two compression engines 310, 320 by maintaining two separate circular compression queues in local memory 120. Control blocks 200 placed in the first queue will be handled by the first compression engine 310, while control blocks 200 placed in the second queue will be performed by the second compression engine 320. Although a number of algorithms could be used to assign tasks between the two compression engines 310, 320, the present invention merely alternates tasks between the two engines 310, 320. More advanced work sharing algorithms could easily be developed, and would be well within the scope of the present invention.

As shown in FIG. 1, local memory 120 is dual ported memory. This allows the compression module 130 direct access to the control block compression queues created by microprocessor 110.

Once the microprocessor 110 is ready for a compression engine 310, 320 to begin working on a compression task, a control block is written to one of the queues in local memory 120. The microprocessor 110 then indicates to the compression module 130 that it may begin compression.

Compression Module

As shown in FIG. 3, the main components of data compression module 130 are compression control 300, two compression engines 310, 320, a first and second switch 330, 340, a local bus 350, and a bus interface bridge 360.

The compression control 300 is itself composed of a third switch 385, and three main sub-components: a first compression engine control 370, a second compression engine control 380, and a buffer control 390. The first and second compression engine controls 370, 380 are identical, although more details of the first compression engine control 370 are shown in FIG. 3. These three sub-components are implemented in the preferred embodiment as separate complex programmable logic devices, or CPLDs.

The compression control 300 reads the control block queue stored in local memory 120 through local bus 350 and bus interface bridge 360. The bus interface bridge 360 serves to transfer communications from the local bus 350 used within the compression module 130 to the communication bus (such as PCI) used to communicate between major modules in the switching platform 100. One example of such a bus interface is a V961PBC chip produced by V3 Semiconductor, although those skilled in the art will recognize that other bus interface devices may be used without exceeding the scope of the present invention.

Each compression engine control 370, 380 maintains a pointer to the current control block in its respective queue through a queue pointer register 372. This queue pointer register 372 is initialized by microprocessor 110 at the start-up of platform 100. The compression engine controls 370, 380 also maintain queue control register 374, control block control register 376, and control block status register 378. The queue control register contains bits that manage the function of the queue. In the preferred embodiment, the queue control register 374 contains the following control bits and associated meanings:

| | |
|---|---|
| GO | Whether the compression engine is idle, or whether the next control block should be fetched. |
| CONFIG | Whether or not to configure the compression engines 310, 320 |
| ST_ON_ERR | Whether the compression module should stop on the occurrence of an error |
| P_RST | Whether the compression module 130 should perform a partial reset |
| PARITY | Selects odd or even parity |

The microprocessor 110 sets the queue control register 374 by writing values directly to the queue control register 374. By setting the GO bit, microprocessor 110 indicates to compression module 130 that data is ready for processing.

The control block control register 376 is set to the value of CB_Ctrl 250 when each control block 200 is read. The important values of the control block control register 376 are set forth below:

| | |
|---|---|
| COMPRESS | Whether to compress or decompress the data |
| FIRST | Whether the current control block is the first contiguous packet in the data segment to be compressed |
| LAST | Whether the current control block is the LAST contiguous packet in the data segment to be compressed |
| DONE_INT | Whether the microprocessor 110 should be informed by interrupt that the compression task is completed |
| ERR_INT | Whether the microprocessor 110 should be informed by interrupt that the compression task encountered an error |

Note that the "compression" task can be either a request to compress a packet of data or to decompress a packet of data. The two different tasks are differentiated by the COMPRESS bit. One should also note that it is possible for one, both, or neither of the FIRST and LAST bits to be set. If a segment to be compressed is found in a single, contiguous memory location, only a single control block 200 will be used and both the FIRST and LAST bits will be set. Multiple control block 200 segments could have control blocks that are neither the first nor the last control block 200 in the segment.

Additional values that need to be communicated between the microprocessor 110 and the data compression module 130 could be set in the control block control register 376.

The control block status register 378 contains four bit values relating to the current compression task. In particular, the following four values are found in this register 378:

| | |
|---|---|
| OWNER | Whether the current control block 200 is valid (i.e., whether the ownership bit 210 indicates that the compression module 130 owns the control block 200). |
| DONE | Whether or not the current compression task is complete |
| ERROR | Whether an error was encountered during the compression task |
| EXP | Whether a data expansion error was encountered during the compression task |

When a compression engine 310, 320 has completed its task, the appropriate compression engine control 370, 380 will alter the first word of the control block 200 that contained the instructions for that task. The modified first word 400 is shown in FIG. 4. The rewritten first word 400 contains at bit location 23 an ownership bit 210 set to 0. This indicates that the compression module 130 has completed the compression task. The rewritten first word also contains the length of the result of the compression task 410. Finally, the rewritten first word contains a control block status 420 of three bits in length, which informs the microprocessor 110 whether the compression was done with no errors, with an error, or with a data expansion error. This information is taken from the control block status register 378.

Compression engines 310, 320 perform the actual compression or decompression of data. According to the preferred embodiment of the present invention, the compression algorithm is based on the Lemple-Ziv compression algorithm, and is embodied in a single device. One example of such a compression device is an ALDC1-20S-HA manufactured by IBM. One skilled in the art will recognize that incorporating a hardware compression implementation using the Lemple-Ziv algorithm guarantees complete data integrity. One so skilled would also realize that other compression hardware based upon the same or other compression algorithms could be used in place of the ALDC1-20S-HA devices used in the preferred embodiment.

As shown in FIG. 3, each compression engine 310, 320 includes two ALDC devices: one ALDC upper 312 for upper byte processing and one ALDC lower 314 for lower byte processing. The division of compression work between upper and lower byte devices is well known in the prior art. To function properly, each compression engine 310, 320 must know the size of the entire data stream being compressed. This information is provided by microprocessor 110 through the Rd_Gather 230 value in control block 200. One unique aspect of the present invention is this use of variable length inputs and outputs in the compression stream. In conventional compression engines, standard length packets are used for input into or output from the compression engine.

The compression engine controls 370 and 380 can communicate control instructions and read status information from the compression engines 310, 320 through the local bus 350. Data movement into and out of the ALDC upper 312 and the ALDC lower 314 does not pass through the local bus 350, but rather passes to and from buffer memory 140 through first and second switches 330, 340, and through FIFO buffers 316, 318. Each ALDC 312, 314 is connected to an input FIFO buffer 316, which stores incoming unprocessed data, and an output FIFO buffer 318, which stores outgoing processed data.

FIFO management is maintained by compression control 300 through traditional techniques such as polling or interrupt processing. The input FIFOs 316 are first filled by unprocessed data requested from the buffer memory 140 by the compression control 300. By manipulating the first and second switch 330, 340, the compression control 300 can direct data received from buffer memory 140 to the incoming FIFOs 316 of the appropriate compression engine 310, 320. When the input FIFOs are empty or near empty, compression control 300 requests additional unprocessed data from buffer memory. The ALDC devices read data from the input FIFOs 316, compress or decompress the data, and write the processed data to output FIFOs 318. When an output FIFO 318 is at or near full, or when a compression task is complete, the data is directed by compression control 300 to be written to the buffer memory 140.

Data movement to the compression engines 310, 320 is coordinated by the respective compression engine control 370, 380 and buffer control 390. Buffer control 390 contains four buffer memory registers for each compression engine. The four registers are as follows:

| | |
|---|---|
| Rd_Ptr 392 | Points to the buffer memory location where the data to be compressed or decompressed resides |
| Wr_Ptr 394 | Points to the buffer memory location where the compressed or decompressed data is written |
| Rd_Len 396 | The amount of contiguous data found at Rd_Ptr 392 |
| Wr_Len 398 | The number of words written to Wr_Ptr 394 |

These registers are filled at the start of each control block processing. When the first compression control block is read, these registers are provided with the values of control block locations Rd_Ptr 270, Wr_Ptr 260, Rd_Len 240, and Wr_Len 220. The Rd_Len 396 is decreased for each word of data written from the buffer memory 140 to the input FIFOs 316 of the compression engines 310, 312. In this manner, the completion of the compression task represented by the control block 200 is determined merely by determining when the value of Rd_Len 396 is zero.

Similarly, the value of Wr_Len 398 is decreased for each word of processed data written to the buffer memory 140. If, during compression, the value of Wr_Len 398 is ever zero or below, the minimum compression ratio requested by microprocessor 110 has not been reached. Consequently, the ERROR and EXP bits of control block status register 378 are set, and the microprocessor 110 will be informed of the error by examining the CB Status found in the re-written first word 400 of control block 200.

The compression module 130 can be set to interrupt the microprocessor 110. The two events that can cause an interrupt are the normal completion of a control block 200 or the occurrence of an error. This interrupt behavior is governed by DONE_INT and ERR_INT in control block register 376.

Logic Flow

FIG. 5 is a logic flow diagram showing data flow and control block access from the point of view of the data compression module 130. The following discussion examines logic flow for one data compression engine 310, 320 only. Thanks to the separate compression engine controls 370, 380, and the separate control block queues in local memory 120, each compression engine 310, 320 is handled identically yet independently.

Starting at block 500, the compression module 130 first determines if the CONFIG bit of the queue control register 374 is set at block 502. If so, it is necessary to configure the ALDC devices at step 504 and then clear the CONFIG bit in step 506 before checking the GO bit of the queue control register 374 at step 508. If the CONFIG bit is not set, the GO bit is immediately checked in step 508.

If the GO bit is not set, then the compression module 130 has not been authorized by the microprocessor 110 to compress the next control block. As a result, the compression module 130 will simply wait for a short period at step 510 before starting over at step 500. If the GO bit is set, the compression module 130 will then read the control block 200 referenced by the current address in the queue pointer register 372 (step 512). Once read, the values from the control block 200 are stored in the control block control register 376; the buffer control memory registers 392, and 396; and the owner bit in the control block status register 378 (step 514). At this point, only the Rd_Ptr 392 and the Rd_Len 396 are loaded into the buffer control 390. The Wr_Ptr 394 and the Wr_Len 398 are only loaded once it is determined that the current control block 200 is the first control block in a segment.

In step 516, the owner bit in queue control register 374 is checked to see if the current control block is valid, with the ownership of the control block assigned to compression module 130. If not, the compression module 130 will set the value of the GO bit in queue control register 374 to 0 in step 518. Then the compression module 130 will wait at step 510 before restarted at step 500. Upon restart, the compression module 130 will not get past the check of the GO bit in step 508 until microprocessor 110 directly sets that bit in the queue control register 374.

Of course, step 516 could easily take place before loading the registers in step 514 by merely checking the ownership bit 210 in the control block 200 stored in local memory 120. Both step orders are within the scope of the present invention. In fact, many steps presented in connection with FIGS. 5 and 6 can be completed in a variety of orders. These minor order variations do not significantly alter the functionality of the data compression, and are considered to be within the scope of the present invention.

If the ownership bit in queue control register 374 is valid, then the compression task associated with the control block 200 will be performed, as represented by step 600. The process of performing the compression task is described in more detail below in connection with FIG. 6.

Once the compression task is completed, it is necessary to re-write the first word of the control block associated with the queue pointer 372. In this step 520, the contents of the queue control register 374 are written over memory locations 23:19 in the first word of 400 of control block 200. Note that since the ownership bit is stored in the first location of the queue control register 372, this will change the ownership bit stored at memory location 23. In addition to the status information, it is also necessary to write the length of the compressed or decompressed data outputted in this compression task. This length can be derived from the value in Wr_Len 398 as subtracted from the original value of Wr_Len 398, or can be obtained from the registers in the compression engines 310, 320 themselves.

Finally, the queue pointer register 372 is incremented in step 522 so as to point to the next control block 200 in the control block queue. Note that since the queue is circular, this incrementation will eventually overflow a portion of the queue pointer register 372, bringing the address in the register 372 back to the first control block in the queue. Once the queue pointer 372 is incremented, the process is complete at step 524. Upon completion the system will preferably restart on the compression task in the next control block 200 by restarting at step 500.

Figure 6A:
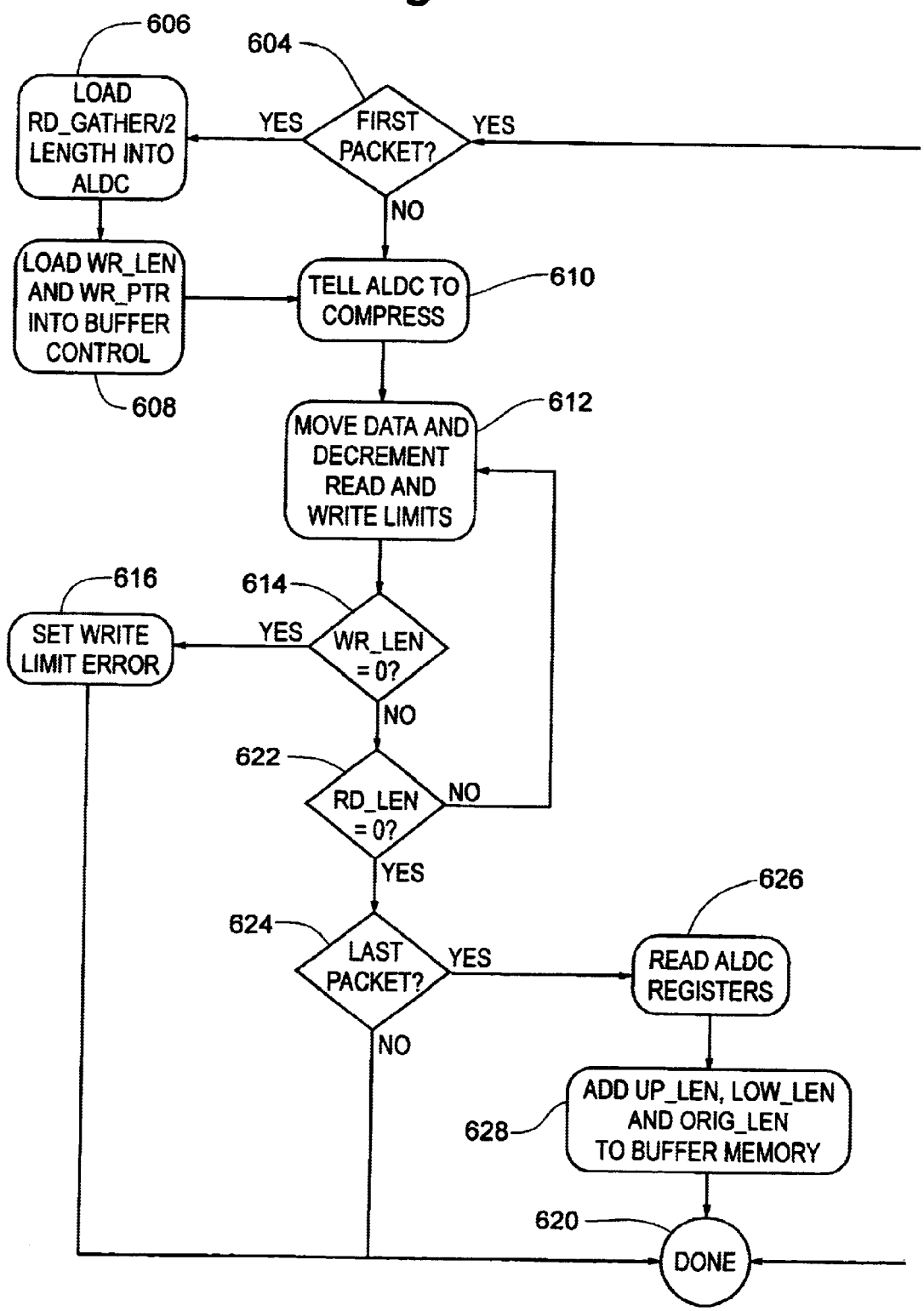
FIG. 6 is a data flow logic diagram for performing a control block.
Figure 6B:
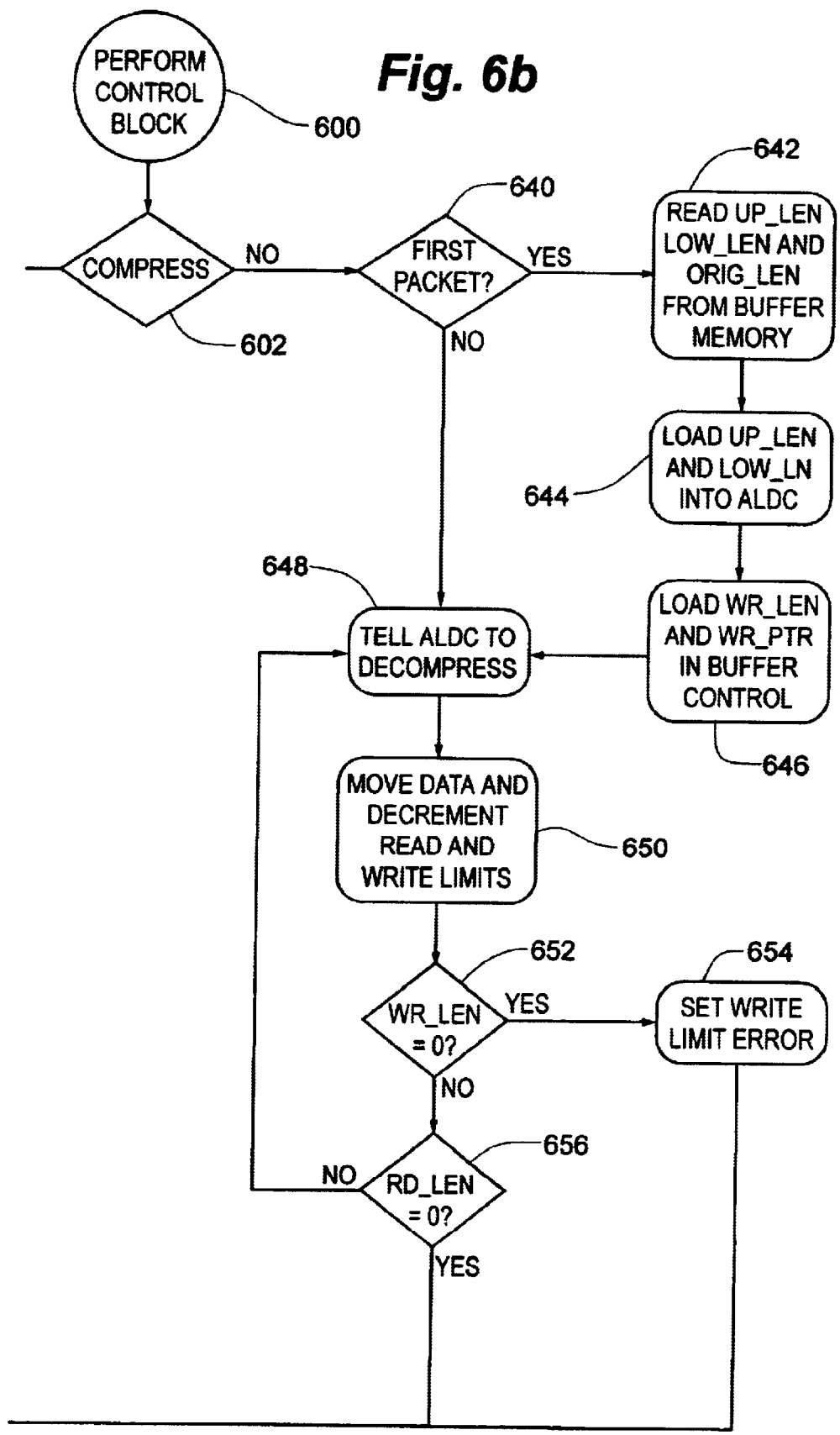

Turning now to FIG. 6, we see that the details of performing the compression task 600 in a control block 200 are set forth. The first step in this process is to determine whether the task is to compress the data or to decompress the data. This determination, made at step 602, is made by examining the COMPRESS bit in the control block control register 376.

If step 602 determines that the data is to be compressed, the compression module 130 then needs to determine in step 604 whether this is the first control block in the data segment being compressed. Again, this determination is made by examining a bit in the control block register 376, namely the FIRST bit. If so, then it is necessary to inform the ALDC devices of the total size of the data to be compressed. This size is found in the control block 200 read at step 512 in the Rd_Gather location 230. This value tells the compression module of the size of the entire unprocessed data segment. Since each of the ALDC devices 312, 314 deal with only half of the data handled by the compression engine (either the upper or lower bytes), the Rd_Gather value 230 is divided by two before it is loaded into ALDC devices 312, 314 in step 606. Next, since this is the first control block 200, the Wr_Ptr 394 and the Wr_Len 398 are loaded with the appropriate values 260, 220 from the current control block 200. By only loading these values on the first control block 200 in a segment, the compression module is able to preserve the state of these values throughout a multiple control block non-contiguous segment.

After loading the length value into ALDC devices 312, 314, or directly after determining that the current contiguous packet is not the first packet, compression module 130 then informs the ALDC devices 312, 314 that they are to compress the data. This occurs in step 610. Next, in step 612, the compression control 300 loads the input FIFO buffers 316 with unprocessed data from the buffer memory 140. This step also is responsible for taking processed data from the output FIFO buffers 318 and writing it to buffer memory 140. The read and write locations in buffer memory are specified in the registers in buffer control 390, as explained above. As data is written to and from FIFO buffers 316, 318, the Rd_Len 396 and the Wr_Len 398 are decreased accordingly.

Compression module 130 periodically determines whether the Wr_Len 398 has reached zero in step 614. If so, the compression module 130 knows that the desired compression ratio was not met. Consequently, the write limit error bit, or EXP, is set in the control block status register 378 is set in step 616, and the performance of the compression task is considered complete (step 620). In some configurations, the ERROR bit will also be set on a data expansion error. In other configurations, it would be possible for the ERROR bit to signal only a non-data expansion error. In these latter cases, only the EXP bit would be set on data expansion errors.

If the write limit has not been reached, the Rd_Len 396 value is checked to see if all of the data in the current contiguous block has been fed to the compression engine 310 or 320. If Rd_Len 396 is still above zero, the compression engine continues to manage the FIFO buffers 316, 318 in step 612. If step 622 finds that Rd_Len 396 is zero, the compression engine waits for all data in the input FIFOs 316 to be processed and the data in the output FIFOs 318 to be written to the buffer memory 140 before continuing.

When step 624 is reached, the compression task represented by the control block 200 has been completed. Step 624 then checks to determine if this control block contained the last contiguous block of data in the total segment being compressed. This is done by checking the LAST bit in the control block control register 376. If not, the compression task is complete at step 620.

If this is the last control block 200 in a segment, then it is necessary to write a compression header to the data stored in the buffer memory 140. The header is created by reading the value of registers in the ALDC devices 312, 314 in step 626. These registers indicate the size of the original data segment compressed (loaded to the registers in step 606), as well as the size of the upper compressed data and the lower compressed data. This information is then written as a compression header to the buffer memory in step 628. The compression header is defined to be sixteen bytes long, with the original, upper compressed, and lower compressed lengths each taking up four bytes. The final four bytes of the compression header are undefined. The compression header is written to the beginning of the data written to the buffer memory 140. This location was the original write location, or Wr_Ptr 260, from the first control block 200 associated with this data segment. To leave room for this header, the first processed data written to the buffer memory starts 16 bytes after this original write location. This can be accomplished by adding on the sixteen bytes before loading the Wr_Ptr 394 in step 608. The original write location must then be stored either in the control module 130 or simply by being left in the control block 200 stored in local memory 120. This storage allows the original write location to be available at step 628. After the compression header is written to buffer memory 140, the compression task completes at step 620.

If the compression module 130 determines at step 602 that the control block 200 contains instructions to decompress data, then the next step is to determine whether the control block 200 contains the first contiguous data block in the segment. This is done at step 640, and is done in the same manner as step 604, which was described above in connection with compressing data.

If this is the first control block 200, then the compression module reads the compression header from the buffer memory 140 in step 642. As explained above, this header contains the original length of the data segment, and the compressed upper and lower lengths of the compressed data. In step 644, the compressed upper and lower lengths are then loaded into the registers of the ALDC devices 312, 314, as is required for data decompression with these devices.

In step 646, the Wr_Len register 398 in buffer control 390 is then loaded with the value of the Wr_Len 220 from control block 200. Step 646 also loads the Wr_Ptr 398 with the value of write pointer location 260 indicated in the control block 200.

The ALDC devices are then told to decompress data in step 648, which is also the next step if step 640 determines that the control block 200 is not the first in a segment. Step 650 then manages data flow between FIFO buffers 316, 318 and buffer memory 140, as was described above in connection with step 612.

Periodically, step 652 will check the value of Wr_Len 398 to see if the write limit has been exceeded. If so, the write limit error bit, or EXP, is set in the control block status register 378 is set in step 654, and the performance of the compression task is considered complete (step 620).

Assuming step 652 does not find a write limit error, step 656 will check the value of Rd_Len 396 to see if all of the data in the current contiguous block has been fed to the decompression engine 310 or 320. If Rd_Len 396 is still above zero, the compression engine continues to manage the FIFO buffers 316, 318 in step 650. If Rd_Len 396 is zero, the decompression engine waits for all data in the input FIFOs 316 to be processed and the data in the output FIFOs 318 to be written to the buffer memory 140 before continuing.

The compression engines 310, 320 are capable of interrupting the compression engine controls 370, 380 if they encounter an error. Upon such an interrupt, the ERROR bit in the control block status register 378 is set and the compression task for this control block 200 is completed.

Microprocessor

From the point of view of the microprocessor 110, the compression and decompression tasks are handled merely by making a control block entry in one of the compression queues and marking the owner as the compression engine. When data comes through one of the ports 150 and interfaces 160, it is stored in buffer memory 140 with the destination information known to microprocessor 110. The microprocessor 110 can engage in a variety of logic to determine whether or not the data should be compressed or decompressed. For instance, the microprocessor can compress only those data segments that are being transmitted to a location where another platform 101 is available to decompress the data. Additionally, microprocessor can determine the size of segment, and send only data segments of a certain size to the compression module 130.

Since the compression technique used by the data compression module 130 does not overwrite data in the buffer memory, the microprocessor 110 maintains a great deal of control over data movement in the platform 100. For instance, the microprocessor 110 can have the compression module 130 attempt to meet a certain compression ratio on a data segment. If the status returned from the data compression module 130 indicates that the maximum compression size was exceeded, the microprocessor can choose to send the uncompressed data maintained in the buffer memory 140. In addition, if there is a problem with receiving compressed data at a remote platform 101, the microprocessor 110 can choose to re-send the uncompressed data in the next attempt.

The microprocessor 110 could also maintain a temporal history of failures to achieve certain compression ratios between certain devices. In these circumstances, microprocessor 110 could select never to attempt compression along such a data path, or to suspend compression attempts for that data path temporarily.

In addition, it should be realized that the utilization of the data compression module 130 in the switching platform 100 allows automatic compression of data without the compression of header information. The data incoming from an Interface 160 is stored in buffer memory 140. Data compression module 130 is then directed to compress the data without fear of the header information being compressed. When a second interface 160 then transmits the data stored in buffer memory, it treats the compressed data the same as it treats non-compressed data. The data is packetized according to the protocol known by the interface 160, and then header information is attached to the created packets. Using this technique, compression is easily achieved over interfaces that have been resistant to the development of compression schemes, such as ATM.

Slave Units

It is also possible to add a one or more additional compression modules to the first compression module 130. In this case, the device recognizes that there are more than one compression modules during start-up diagnostics. The additional modules will automatically be configured as slaves to the first module, providing the system with four or more compression engines through one control interface, further increasing the efficiency of the compression processing. All that would be necessary is to establish and designate one control block queue for each compression engine.

Encryption

In addition to data compression, the framework of the present invention can also be utilized to encrypt data being transmitted over a switching platform. Secure computing environments will desire that all data be encrypted before being transmitted over public or publicly accessible networks. As explained above in connection with compression, it is important that the encryption take place without slowing data transmission, and that it can be implemented on data pathways selectively.

A person of ordinary skill in data transmission could easily utilize the present invention for implementing a method and system of encrypting data. The compression engines in the above description would be replaced with encryption engines. The process for re-sending data uncompressed and for sending small data packets uncompressed would be skipped to ensure that all data sent over a public network is encrypted.

Conclusion

It is to be understood that the above description is intended to be illustrative, and not restrictive. The invention is not to be taken as limited to all of the details of this description, as modifications and variations thereof may be made without departing from the spirit or scope of the invention. Many other embodiments will be apparent to those of skill in the art upon reviewing the above description. For instance, although the described embodiment of the present invention utilizes this shared queue structure, those skilled in the art will recognize that other methods of exchanging data and control packets can be used without exceeding the scope of the present invention. One skilled in the art would also recognize that other compression chips might be employed without exceeding the scope of the present invention. The scope of the invention should, therefore, be determined with reference to the appended claims, along with the full scope of equivalents to which such claims are entitled.

What is claimed is:

1. A data processing module for processing raw data in a main buffer memory into processed data, the module comprising:
    a) at least one processing engine having a processing device, an input buffer, and an output buffer;
    b) a communications path linking the input and output buffers of the processing engine with the main buffer memory;
    c) a processing control memory having
        i) at least two different raw data memory locations each indicating a separate location in the main buffer memory of the raw data,
        ii) at least one processed data memory location indicating a location in buffer memory for storing processed data; and
    d) a buffer handling mechanism for directing raw data from the one of the raw data memory locations to one of the input buffers, and further for directing data from one of the output buffers to one of the processed memory locations.

2. The data processing module of claim 1, wherein the processing device encrypts and decrypts the raw data and further comprising
    e) an instruction receiving interface for receiving processing instructions, the instructions indicating the raw data memory location, the processed data memory location, and a raw data length indicating the size of the raw data to be processed.

3. The data processing module of claim 1, wherein the processing device compresses and decompresses the raw data and further comprising
    e) an instruction receiving interface for receiving processing instructions, the instructions indicating the raw data memory location, the processed data memory location, and a raw data length indicating the size of the raw data to be processed.

4. The data processing module of claim 3, wherein the processing device utilizes the Lemple-Ziv compression and decompression algorithm.

5. The data processing module of claim 3 wherein the instruction receiving interface is a queue of control blocks, wherein each control block contains instructions for compressing or decompressing a segment of data.

6. The data processing module of claim 5, wherein the instruction receiving interface receives instructions from a next control block in the queue after the instructions in a current control block are completed.

7. The data processing module of claim 6, wherein the segment of data is located in contiguous memory locations in the buffer memory.

8. The data processing module of claim 6, wherein there are a plurality of processing engines and a plurality of control block queues, with each processing engine having a one-to-one relationship with a single control block queue.

9. The data processing module of claim 6, wherein the instruction receiving interface further comprises a writing mechanism to write to the current control block the result of the compression.

10. The data processing module of claim 3, further compressing
    f) a compression header generation means for generating and writing to the buffer memory a compression header containing information regarding the size of the processed data.

11. The data processing module of claim 1, wherein the plurality of raw data memory locations coexist within the processing control memory at a certain time.

12. The data processing module of claim 11, wherein the plurality of raw data memory locations are stored by the processing control memory in a queue structure having multiple entries, with each entry containing the raw data location for a separate segment of data within the main buffer.

13. The data processing module of claim 12, wherein each entry in the queue further contains a separate processed data memory location.

14. The data processing module of claim 13, wherein each entry in the queue further contains a raw data size indicating the size of the raw data to be processed.

15. The data processing module of claim 1, wherein the raw data memory locations and the processed data memory location are found on the same multi-ported main buffer memory.

16. A data compression module for compressing data in a buffer memory, the data compression module comprising:
    a) a buffer memory interface in communication with the buffer memory, the buffer memory interface allowing storage and retrieval access to memory locations in the buffer memory;
    b) an instruction receiving interface, for receiving instructions relating to the compression and decompression of data in the buffer memory including a location in buffer memory of unprocessed data and a location in buffer memory for storage of processed data;
    c) a plurality of compression engines, each in communication with the buffer memory interface;
    d) a compression control circuitry in communication with the buffer memory interface and the instruction receiving interface, the compression control circuitry having circuitry for managing each compression engine independently.

17. An apparatus for transmitting data comprising:
a) a receiving port that receives raw data;
b) a buffer memory that stores data at specific memory locations, the buffer memory being in communication with the receiving port;
c) a microprocessor in communication with the buffer memory;
d) an instruction storage structure for storing processing instructions created by the microprocessor, the processing instructions indicating a location of raw data in the buffer memory;
e) a processing module in communication with the instruction storage structure and the buffer memory, the processing module having
 i) a processing engine for converting the raw data into processed data; and
 ii) a processing control for managing movement of the raw data from the buffer memory to the processing engine when indicated by the processing instructions, and for managing movement of the processed data from the processing engine to the buffer memory; and
f) a transmitting port that transmits the processed data.

18. The apparatus of claim 17, wherein the processing engine encrypts and decrypts the raw data.

19. The apparatus of claim 17, wherein the processing engine compresses and decompresses the raw data.

20. The apparatus of claim 19, wherein the processing instructions further indicate a location for storage of the processed data in the buffer memory and whether to compress or decompress the raw data.

21. The apparatus of claim 20, wherein the processing instructions further indicate a maximum size for the processed data and further wherein the compression module generates an error if the maximum size for the processed data is exceeded.

22. The apparatus of claim 19, wherein the microprocessor selectively determines whether or not to compress raw data according to one or more of the following criteria
 i) the size of the raw data;
 ii) the decompression capabilities available to a receiving device; and
 iii) the compressability of the data.

23. The apparatus of claim 19, wherein the microprocessor is capable of directing the transmitting port to transmit the raw data if an error occurs during transmission of the processed data.

24. The apparatus of claim 17, wherein the instruction storage structure is a queue stored in a shared memory directly accessible by the microprocessor and the compression module.

25. The apparatus of claim 24, wherein the processing module further comprises at least one additional processing engine and associated processing control, and wherein the shared memory contains an additional queue for each additional processing engine.

26. The apparatus of claim 17, further comprising:
g) a receiving interface located between the receiving port and the buffer memory and a transmission interface located between the transmitting port and the buffer memory, each interface having converters capable of converting data between a known network or channel protocol and a common data protocol used for storing data in the buffer memory.

27. The apparatus of claim 17, wherein the receiving port, the buffer memory, the microprocessor, and the compression module each exist on separate physical computing boards communicating via a communications bus.

28. The apparatus of claim 27, wherein the computing boards are cards on a PCI communications bus.

29. The apparatus of claim 27, wherein the microprocessor is able to directly access control registers on the compression module.

30. A method for transmitting compressed data comprising the steps of:
a) receiving raw data having an original length and destination information on a reception port;
b) storing the raw data in a buffer memory;
c) analyzing the destination information of the raw data;
d) submitting compression instructions including a raw data buffer memory location to a compression module;
e) compressing in the compression module the raw data found at the raw data buffer memory location;
f) storing compressed data in the buffer memory at a location other than the raw data buffer memory location; and
g) transmitting the compressed data out a transmission port according to the destination information.

31. The method of claim 30, further comprising the step of adding header information containing the original length of the raw data to the compressed data before transmitting the compressed data.

32. The method of claim 30, further comprising the step of making a determination to compress the raw data before submitting the compression instructions to the compression module.

33. The method of claim 32, wherein the step of making a determination to compress the raw data includes at least one of the following substeps:
 i) determining whether the size of the raw data exceeds a preset minimum size;
 ii) determining whether a destination indicated by the destination information is capable of decompressing data; and
 iii) determining whether recent raw data received from the reception port with the same destination information reached an acceptable level of compression.

34. The method of claim 30, wherein the step of submitting compression instructions includes the substep of submitting a maximum size for the compressed data to the compression module; and wherein the step of compressing the raw data includes the substep of terminating the compression with an error if the compressed data exceeds the maximum size for the compressed data submitted to the compression module.

35. An apparatus for transmitting compressed data comprising:
a) means for receiving raw data having an original length and destination information on a reception port
b) means for storing the raw data in a buffer memory;
c) means for analyzing the destination information of the raw data;
d) means for submitting compression instructions including a raw data buffer memory location to a compression module, the compression module having means for compressing the raw data found at the raw data buffer memory location;
e) means for storing the compressed data in the buffer memory at a location other than the raw data buffer memory location; and f) means for transmitting the compressed data out a transmission port according to the destination information.

36. A method for compressing data comprising the steps of:
   a) receiving uncompressed data formatted according to a first communications protocol incorporating destination information;
   b) converting the uncompressed data to a common protocol;
   c) storing the converted, uncompressed data in a buffer memory;
   d) compressing the uncompressed data found in the buffer memory without compressing destination information;
   e) storing the compressed data in the buffer memory at a memory location different from that of the uncompressed data;
   f) converting the compressed data and the destination information into a second communications protocol;
   g) transmitting the compressed data according to the second communications protocol.

37. A method for compressing and decompressing data in a compression module comprising the steps of:
   a) reading a control block defining a task from a control block queue, the control block containing control information, read and write buffer memory locations, and read data size information;
   b) analyzing the control information to determine whether the data is to be compressed or decompressed and so informing at least one compression device;
   c) managing FIFO inputs and outputs of the at least one compression device by loading FIFO inputs with raw data from the read buffer memory location and by writing processed data from FIFO outputs to the write buffer memory location;
   d) tracking the amount of data processed by the compression devices and terminating the task when all data has been processed; and
   e) loading compressed data size, upon completion of a compression task, to a compression header at a known location proximate the write buffer memory location.

38. The method of claim 37, further comprising the step of verifying that the control block is ready for processing by examining ownership information found in the control block.

39. The method of claim 37, further comprising the step of determining whether an internal GO bit authorizes compression before reading the control block.

40. The method of claim 37, further comprising the step of communicating task status outside of the compression module when a task is completed.

41. The method of claim 40, wherein the step of communicating task status further comprises the substep of writing status information to the control block.

42. A method of compressing and decompressing data transmitted between two remote locations comprising:
   a) receiving at a first location uncompressed data of an original length along with destination information identifying a second location;
   b) storing the uncompressed data in a buffer memory;
   c) taking the uncompressed data from the buffer memory and compressing the uncompressed data to a compressed length;
   d) storing the compressed data in the buffer memory at a memory location different from that of the uncompressed data; and
   e) transmitting to the second location the compressed data along with a compression header, the compression header containing the original length and the compressed length.

43. The method of claim 42, wherein the compression header is written to adjacent to the compressed data stored in the buffer memory and then transmitted as a contiguous data block from the buffer memory.

44. The method of claim 42, wherein the step of compressing is accomplished by two compression devices, one for upper byte processing and one for lower byte processing.

45. The method of claim 44, wherein the compressed length is a combination of a compressed upper length indicating the length of the upper byte compression and a compressed lower length indicating the length of the lower by compression.

46. The method of claim 42, further comprising:
   f) receiving the compression header and compressed data at the second location; and
   g) decompressing the data at the second location, using the original length from the compression header to prevent decompression errors.

* * * * *